US008594371B2

(12) United States Patent
Ito (10) Patent No.: US 8,594,371 B2
(45) Date of Patent: Nov. 26, 2013

(54) SUBJECT TRACKING DEVICE AND CAMERA (75) Inventor: Yuichi Ito, Tokyo (JP)

(73) Assignee: Nikon Corporation, Tokyo (JP)

(*) Notice: Subject to any disclaimer, the term of this patent is extended or adjusted under 35 U.S.C. 154(b) by 594 days.

(21) Appl. No.: 12/752,414

(22) Filed: Apr. 1, 2010

(65) Prior Publication Data
US 2010/0260381 A1 Oct. 14, 2010

(30) Foreign Application Priority Data

Apr. 8, 2009 (JP) ................................. 2009-093676

(51) Int. Cl.
G06K 9/00 (2006.01)

(52) U.S. Cl.
USPC ......................................................... 382/103

(58) Field of Classification Search
USPC .................. 382/103, 209, 216–220; 348/169; 235/411, 412
See application file for complete search history.

(56) References Cited

U.S. PATENT DOCUMENTS

| 3,614,736 | A | * | 10/1971 | McLaughlin et al. | 382/216 |
| 5,208,667 | A | * | 5/1993 | Saunders | 348/452 |
| 5,640,200 | A | * | 6/1997 | Michael | 348/87 |
| 6,611,613 | B1 | * | 8/2003 | Kang et al. | 382/118 |
| 6,687,386 | B1 | | 2/2004 | Ito et al. | |
| 6,704,725 | B1 | * | 3/2004 | Lee | 1/1 |
| 7,397,931 | B2 | * | 7/2008 | Imagawa et al. | 382/103 |
| 8,144,934 | B2 | | 3/2012 | Abe et al. | |
| 2004/0136567 | A1 | * | 7/2004 | Billinghurst et al. | 382/103 |
| 2007/0071289 | A1 | * | 3/2007 | Takeguchi et al. | 382/118 |
| 2007/0291984 | A1 | * | 12/2007 | Yang et al. | 382/103 |
| 2008/0112613 | A1 | * | 5/2008 | Luo et al. | 382/167 |
| 2008/0285809 | A1 | | 11/2008 | Abe et al. | |
| 2009/0022364 | A1 | * | 1/2009 | Swaminathan et al. | 382/103 |
| 2009/0052741 | A1 | * | 2/2009 | Abe | 382/103 |
| 2009/0087103 | A1 | * | 4/2009 | Abe et al. | 382/209 |
| 2010/0104134 | A1 | * | 4/2010 | Wang et al. | 382/103 |
| 2010/0191769 | A1 | * | 7/2010 | Koyama et al. | 707/780 |

FOREIGN PATENT DOCUMENTS

| CN | A-101311965 | 11/2008 |
| JP | A-2000-276597 | 10/2000 |
| JP | A-2003-70742 | 3/2003 |
| JP | A-2005-301984 | 10/2005 |

(Continued)

OTHER PUBLICATIONS

Japanese Office Action in Japanese Patent Application No. 2009-093676; dated Feb. 22, 2011 (with English-language translation).

(Continued)

Primary Examiner — Shervin Nakhjavan
(74) Attorney, Agent, or Firm — Oliff & Berridge, PLC (57) ABSTRACT A subject tracking device includes: a first similarity factor calculation unit that compares an input image assuming characteristics quantities corresponding to a plurality of characteristics components, with a template image assuming characteristics quantities corresponding to the plurality of characteristics components, and calculates a similarity factor indicating a level of similarity between the input image and the template image in correspondence to each of the plurality of characteristics components; a normalization unit that normalizes similarity factors corresponding to the plurality of characteristics components having been calculated by the first similarity factor calculation unit; and a second similarity factor calculation unit that calculates a similarity factor indicating a level of similarity between the input image and the template image based upon results of normalization achieved via the normalization unit.

5 Claims, 5 Drawing Sheets

(56) References Cited

FOREIGN PATENT DOCUMENTS

| | | |
|---|---|---|
| JP | B2-3768073 | 4/2006 |
| JP | A-2006-229322 | 8/2006 |
| JP | A-2006-259847 | 9/2006 |
| JP | A-2007-208757 | 8/2007 |
| JP | A-2008-204307 | 9/2008 |
| JP | A-2008-271006 | 11/2008 |

OTHER PUBLICATIONS

Nov. 22, 2011 Office Action issued in Japanese Patent Application No. 2009-093676 (with English-language translation).

Aug. 20, 2013 First Examination Opinion Notification issued in Chinese Patent Application No. 201010162317.7 (with translation).

* cited by examiner

POSITION DETECTED AS BEST MATCH POSITION

SUBJECT TRACKING DEVICE AND CAMERA

INCORPORATION BY REFERENCE

The disclosure of the following priority application is herein incorporated by reference:

Japanese Patent Application No. 2009-093676 filed Apr. 8, 2009

BACKGROUND OF THE INVENTION

1. Field of the Invention

The present invention relates to a subject tracking device and a camera.

2. Description of Related Art

Japanese Patent Publication No. 3768073 discloses an object tracking device. The object tracking device disclosed in the publication tracks a photographic subject by calculating the level of similarity manifesting between a template and an image through an arithmetic operation method known as normalized correlation.

There is an issue that the similarity level calculation methods normally adopted in object tracking devices in the related art such as that mentioned above, fail to address effectively in that a high level of accuracy cannot be assured for the similarity level calculated for an image with different gains applied in correspondence to various image components such as the brightness and the chrominance.

SUMMARY OF THE INVENTION

A subject tracking device according to a first aspect of the present invention comprises: a first similarity factor calculation unit that compares an input image assuming characteristics quantities corresponding to a plurality of characteristics components, with a template image assuming characteristics quantities corresponding to the plurality of characteristics components, and calculates a similarity factor indicating a level of similarity between the input image and the template image in correspondence to each of the plurality of characteristics components; a normalization unit that normalizes similarity factors corresponding to the plurality of characteristics components having been calculated by the first similarity factor calculation unit; and a second similarity factor calculation unit that calculates a similarity factor indicating a level of similarity between the input image and the template image based upon results of normalization achieved via the normalization unit.

According to a second aspect of the present invention, in the subject tracking device according to the first aspect, it is preferable that the normalization unit normalizes the similarity factors corresponding to the plurality of characteristics components by multiplying the similarity factors by normalizing values used to equalize the similarity factors corresponding to the individual characteristic components.

According to a third aspect of the present invention, the subject tracking device according to the second aspect may further comprise a weighting unit that weights the similarity factors, having been calculated for the plurality of characteristics components, in correspondence to characteristics of the input image.

According to a fourth aspect of the present invention, in the subject tracking device according to the second aspect, it is preferable that the normalizing values are calculated and recorded into a storage medium in advance; and the normalization unit reads out the normalizing values from the storage medium and executes normalization.

According to a fifth aspect of the present invention, in the subject tracking device according to the first aspect, it is preferable that the plurality of characteristics components are a brightness component and a chrominance component of the image; and the first similarity factor calculation unit calculates a similarity factor indicating a level of similarity between the brightness component of the input image and the brightness component of the template image and a similarity factor indicating a level of similarity between the chrominance component in the input image and the chrominance component in the template image.

A camera according to a sixth aspect of the present invention is equipped with a subject tracking device according to the first aspect.

DESCRIPTION OF PREFERRED EMBODIMENTS

First Embodiment

Figure 1:
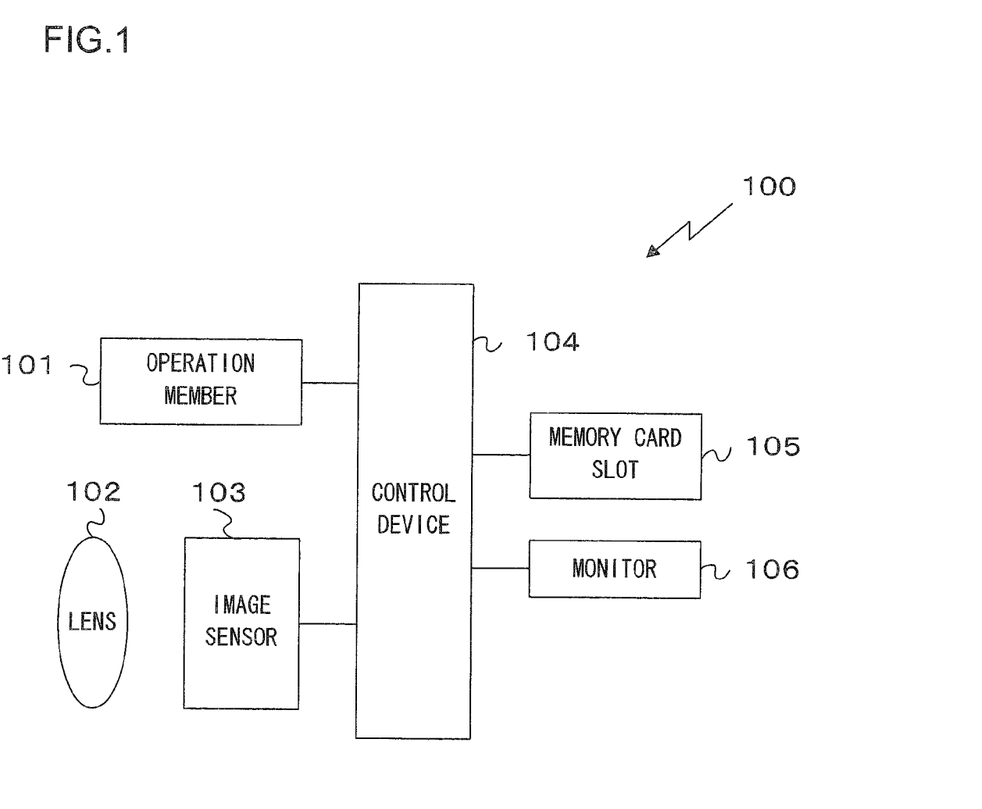
FIG. 1 is a block diagram showing the structure of a camera achieved in an embodiment of the present invention.

FIG. 1 is a block diagram showing the structure adopted in a camera equipped with a subject tracking device achieved in the first embodiment of the present invention. The camera 100 comprises an operation member 101, a lens 102, an image sensor 103, a control device 104, a memory card slot 105 and a monitor 106. The operation member 101 includes various input members operated by the user, such as a power button, a shutter release button, a zoom button, a cross key, an OK button, a reproduce button and a delete button.

While the lens 102 is constituted with a plurality of optical lenses, the plurality of optical lenses are represented by a single lens in FIG. 1. The lenses constituting the lens 102 include a zoom lens used to adjust the zoom magnification rate and a focus adjustment lens (AF lens) used to adjust the focusing condition. The image sensor 103, which may be, for instance, a CCD image sensor or a CMOS image sensor, captures a subject image formed through the lens 102. The image sensor 103 then outputs image signals expressing the image having been captured to the control device 104.

Based upon the image signals input thereto from the image sensor 103, the control device 104 generates image data (hereafter referred to as "main image data") in a predetermined image format such as the JPEG format. In addition, based upon the main image data thus created, the control device 104 generates display image data such as thumbnail image data. The control device 104 then creates an image file that contains the main image data and the thumbnail image data having been generated as well as additional header information, and outputs the image file to the memory card slot 105.

The image file output from the control device 104 is written and thus recorded into a memory card that is loaded at the memory card slot 105 and is utilized as a storage medium. In addition, in response to an instruction issued by the control device 104, an image file, stored within a memory card loaded into the memory card slot 105, is read out.

The monitor 106 is a liquid crystal monitor (rear side monitor) mounted at the rear surface of the camera 100. At the monitor 106, an image stored in the memory card, a setting menu in which settings for the camera 100 are selected, or the like is brought up on display. In addition, as the user sets the camera 100 in a photographing mode, the control device 104 outputs to the monitor 106 display image data for images obtained in time series from the image sensor 103. As a result, a through image or live view image is displayed at the monitor 106.

The control device 104, constituted with a CPU, a memory and other peripheral circuits, controls the camera 100. It is to be noted that the memory constituting the control device 104 includes an SDRAM and a flash memory. The SDRAM, which is a volatile memory, is used by the CPU as a work memory where a program to be executed is opened or as a buffer memory where data are temporarily recorded. In the flash memory, which is a non-volatile memory, program data related to the program executed by the control device 104, various parameters that are read during program execution and the like are recorded.

The control device 104 in the embodiment executes template matching processing for each frame of live view image input from the image sensor 103 in reference to a template image prepared in advance and identifies an image area within the frame manifesting similarity to the template image as a subject area. The control device 104 then executes subject tracking processing through frame-to-frame tracking of the identified subject area.

Figure 2:
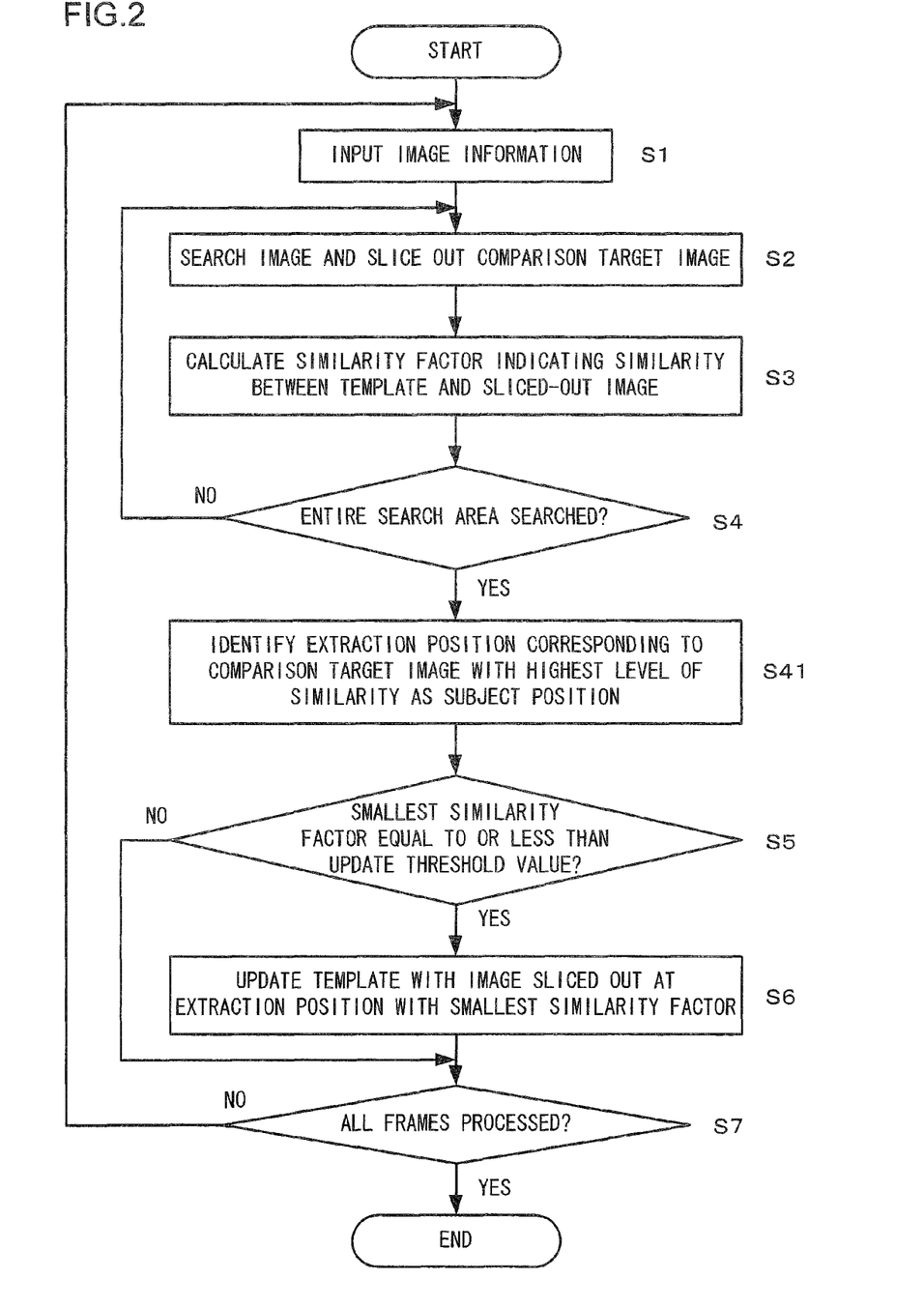
FIG. 2 presents a flowchart of the template matching processing.

The following is a detailed description of the template matching processing executed in the embodiment, given in reference to the flowchart presented in FIG. 2. It is to be noted that the processing shown in FIG. 2 is executed by the control device 104 based upon a program that is started up as a live view image photographing operation starts.

In step S1, the control device 104 designates the image having been input (hereafter referred to as the "input image") as a matching target, and then the operation proceeds to step S2. In step S2, the control device 104 slices out an image portion within the input image, which ranges over an area matching the size of the template image, and designates the image portion thus sliced out as a comparison target image. The operation then proceeds to step S3 in which the control device 104 compares the comparison target image having been sliced out with the template image and calculates a similarity factor. It is to be noted that the method adopted in the embodiment when calculating the similarity factor is to be described later. The operation then proceeds to step S4.

In step S4, the control device 104 makes a decision as to whether or not the similarity factor has been calculated in correspondence to each comparison target image having been sliced out from a search area, e.g., from the entire range of the input image or from a specific area set within the input image. If a negative decision is made in step S4, the operation returns to step S2 to repeat the processing. It is to be noted that the control device 104 repeats the processing by offsetting the extraction position at which it slices out the comparison target area in step S2 from the previous extraction position and thus, similarity factors are ultimately calculated to indicate the similarity between the template image and the comparison target images sliced out from the entire search area. If an affirmative decision is made in step S4, the operation proceeds to step S41.

In step S41, the control device 104 determines the extraction position within the input image at which the comparison target image achieving the highest level of similarity to the template image has been sliced out, based upon the similarity factors calculated in step S3 and designates the extraction position thus determined as a subject position. It is to be noted that the similarity factor calculated for a comparison target image through the similarity factor calculation to be detailed later assumes a smaller value (calculated similarity factor value) when the similarity of the comparison target image to the template image is higher. Accordingly, the control device 104 designates the extraction position at which the comparison target image with the smallest similarity factor value has been sliced out as the subject position in step S41. The operation then proceeds to step S5.

In step S5, the control device 104 makes a decision as to whether or not the smallest similarity factor value calculated in correspondence to the subject position having been designated in step S41 (the similarity factor value having been calculated at the extraction position at which the comparison target image with the highest level of similarity has been sliced out) is equal to or less than a predetermined threshold value (hereafter referred to as an "update threshold value"). If a negative decision is made in step S5, the operation proceeds to step S7, which is to be detailed later. If, on the other hand, an affirmative decision is made in step S5, the operation proceeds to step S6.

In step S6, the control device 104 updates the template image by designating the comparison target image for which the smallest similarity factor value has been calculated as the new template image, and then the operation proceeds to step S7. While the shape of the subject may continuously change, the subject can still be reliably tracked without ever losing it by sequentially updating the template image with the sliced-out image achieving a high level of similarity to the current template image as described above.

In step S7, the control device 104 makes a decision as to whether or not all the frames have been processed, i.e., whether or not the live view image input has stopped. If a negative decision is made in step S7, the operation returns to step S1 to repeat the processing. However, if an affirmative decision is made in step S7, the processing ends.

Next, a method that may be adopted in the embodiment to calculate a similarity factor indicating the level of similarity between the template image and a comparison target image is described. The following description is provided by assuming that the similarity factor is calculated through the SAD (sum of absolute differences) method, which is one of the similarity factor calculation methods in the related art. It is to be noted that in the SAD method, the sums of absolute differences are each calculated through a pixel-by-pixel comparison of the comparison target image and the template image and then a similarity factor is calculated by adding up the sums.

First, a typical SAD-based similarity factor calculation method is described. Assuming that the template image and the comparison target image are both expressed in the YCbCr colorimetric system constituted with three components; the brightness component Y and the chrominance components Cb and Cr, similarity factors each corresponding to one of the three components can be calculated as expressed in (1) to (3) below. It is to be noted that $SAD_Y$, $SAD_{Cr}$ and $SAD_{Cb}$ in the following expressions (1) to (3) respectively represent the Y component similarity factor, the Cr component similarity factor and the Cb component similarity factor. In addition, the three components in the comparison target image are respectively notated as $Y_{image}$, $Cr_{image}$ and $Cb_{image}$, whereas the three components in the template image are respectively notated as $Y_{template}$, $Cr_{template}$ and $Cb_{template}$.

$$SAD_Y = \Sigma |Y_{image} - Y_{template}| \quad (1)$$

$$SAD_{Cr} = \Sigma |Cr_{image} - Cr_{template}| \quad (2)$$

$$SAD_{Cb} = \Sigma |Cb_{image} - Cb_{template}| \quad (3)$$

As indicated in expression (4) below, the similarity factor (SAD) indicating the level of similarity between the template image and the comparison target image is normally calculated by adding up the similarity factors corresponding to the individual components having been calculated as expressed in (1) to (3).

$$SAD = SAD_Y + SAD_{Cr} + SAD_{Cb} \quad (4)$$

However, the similarity factor calculated as expressed in (1) to (4) above is bound to contain the individual component similarity factors to which gains reflecting the pixel information and assuming values different from one another, are applied. For instance, provided that each pixel holds information corresponding to the individual components Y, Cb and Cr, $SAD_Y$ calculated as expressed in (1) is bound to assume a value 4 to 6 times larger than the value calculated for $SAD_{Cr}$ as expressed in (2) or the value calculated for $SAD_{Cb}$ as expressed in (3). As expression (4) indicates, the similarity factor SAD is calculated by adding up $SAD_Y$, $SAD_{Cr}$ and $SAD_{Cb}$, and thus, if the gain applied to even one of the components is different, the similarity factor SAD will be calculated without uniformly evaluating the individual components.

Figure 3A:
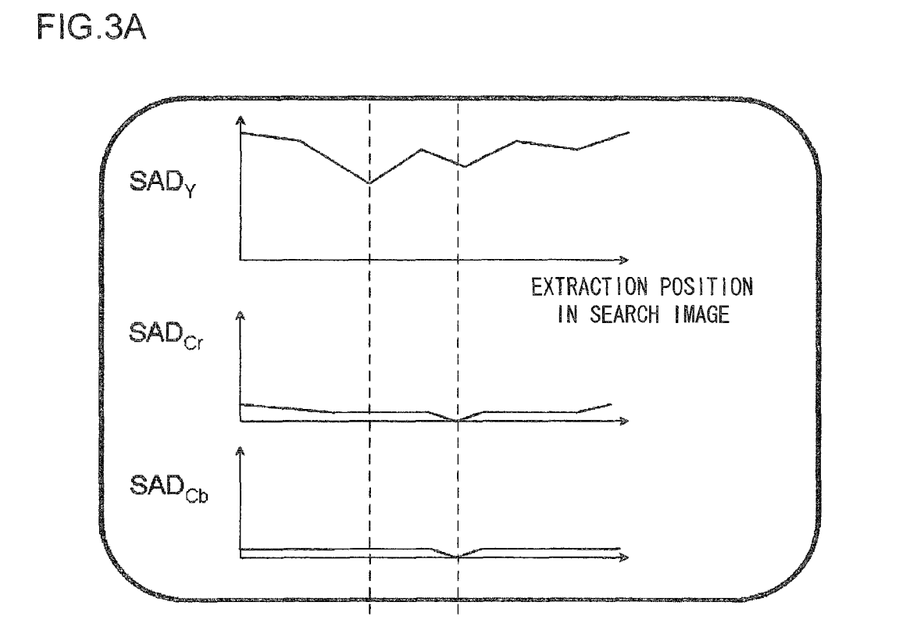
FIGS. 3A and 3B present a schematic illustration of a specific example of a similarity factor calculated without normalization.
Figure 3B:
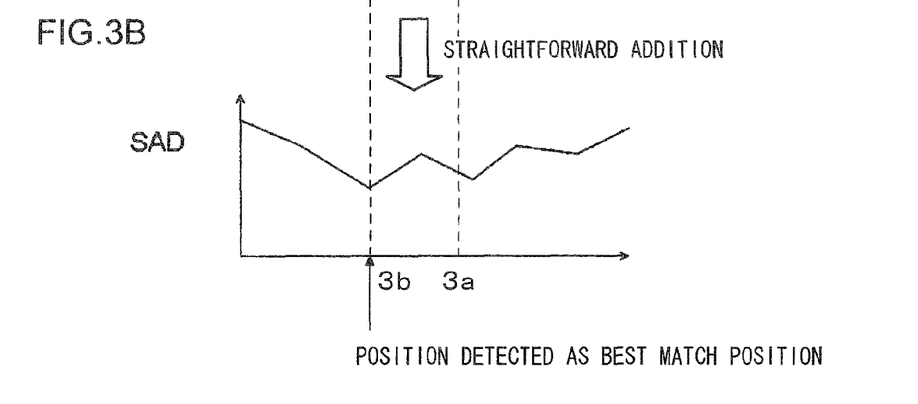

For instance, the gain applied to the Y component similarity factor ($SAD_Y$) may be greater than the gains applied to the $SAD_{Cr}$ and $SAD_{Cb}$, as shown in FIG. 3A. Under such circumstances, the similarity factor SAD calculated as expressed in (4), which is greatly affected by the value of $SAD_Y$, may take on the smallest value at an extraction position 3b, i.e., a non-subject position, at which $SAD_Y$ assumes the smallest value, even though $SAD_{Cr}$ and $SAD_{Cb}$ both assume the smallest values at another extraction position 3a, which is actually the accurate subject position. In such a case, the extraction position 3b will be erroneously designated as the subject position in correspondence to the particular frame.

In order to address this problem, the control device 104 in the embodiment calculates a similarity factor SAD only after normalizing the individual component similarity factors ($SAD_Y$, $SAD_{Cr}$, $SAD_{Cb}$). In order to enable normalization of the individual component similarity factors, similarity factor normalizing values, e.g., a similarity factor normalizing value $N_y$ used to normalize $SAD_Y$, a similarity factor normalizing value $N_{Cr}$ used to normalize $SAD_{Cr}$ and a similarity factor normalizing value $N_{Cb}$ used to normalize $SAD_{Cb}$, are recorded in advance in the flash memory in the camera 100. A method that may be adopted when calculating the similarity factor normalizing values $N_y$, $N_{Cr}$ and $N_{Cb}$ in correspondence to the various components is now described. First, similarity factor averages are calculated in correspondence to the individual components as expressed in (5) to (7) below by using dynamic image data expressing dynamic images captured in standard subject tracking scenes.

$$\overline{SAD_y} = \frac{1}{n} \sum SAD_Y \quad (5)$$

$$\overline{SAD_{Cr}} = \frac{1}{n} \sum SAD_{Cr} \quad (6)$$

$$\overline{SAD_{Cb}} = \frac{1}{n} \sum SAD_{Cb} \quad (7)$$

It is to be noted that the term "standard scenes" is used to indicate scenes selected by excluding non-standard scenes such as a scene captured through monochromatic photographic operation. In addition, expressions (5) to (7) indicate that the similarity factor averages are calculated by using dynamic image samples collected in n different scenes.

Then, the similarity factor normalizing values $N_y$, $N_{Cr}$ and $N_{Cb}$ are calculated as expressed in (8) to (10) by taking the reciprocals of the individual component similarity factor averages having been calculated as expressed in (5) to (7). The embodiment is described by assuming that the similarity factor normalizing values $N_y$, $N_{Cr}$ and $N_{Cb}$ calculated as expressed in (8) to (10) are recorded in the flash memory of the camera 100 in advance.

$$N_y = \frac{1}{\overline{SAD_y}} \quad (8)$$

$$N_{Cr} = \frac{1}{\overline{SAD_{Cr}}} \quad (9)$$

$$N_{Cb} = \frac{1}{\overline{SAD_{Cb}}} \quad (10)$$

The control device 104 in the embodiment reads out the similarity factor normalizing values $N_y$, $N_{Cr}$ and $N_{Cb}$ recorded in the flash memory and calculates the similarity factor SAD indicating the level of similarity between the template image and the comparison target image by first multiplying the individual component similarity factors, i.e., $SAD_Y$, $SAD_{Cr}$ and $SAD_{Cb}$ respectively by the similarity factor normalizing values $N_y$, $N_{Cr}$ and $N_{Cb}$ having been read out and thus normalizing the individual component similarity factors.

In more specific terms, the control device 104 is able to calculate the similarity factor SAD indicating the level of similarity between the frame and the template image by first normalizing the individual component similarity factors, as expressed in (11) below. It is to be noted that in the following expression (11), the entire sum is divided by 3, since the SAD as a whole is constituted with three different components, i.e., $SAD_Y$, $SAD_{Cr}$ and $SAD_{Cb}$.

$$SAD = \frac{1}{3}(N_y \cdot SAD_Y + N_{Cr} \cdot SAD_{Cr} + N_{Cb} \cdot SAD_{Cb}) \quad (11)$$

Since SAD is calculated only after the SAD values corresponding to the individual components are normalized as indicated in expression (11), a uniform weight is applied to the various components and the various component similarity factors (the SAD values corresponding to the various components) are output with a uniform gain applied thereto. As a result, even when a significantly larger gain is initially applied to a given component similarity factor, the similarity factor corresponding to the particular component is not allowed to cause the wrong position within the frame to be erroneously designated as the subject position.

Figure 4A:
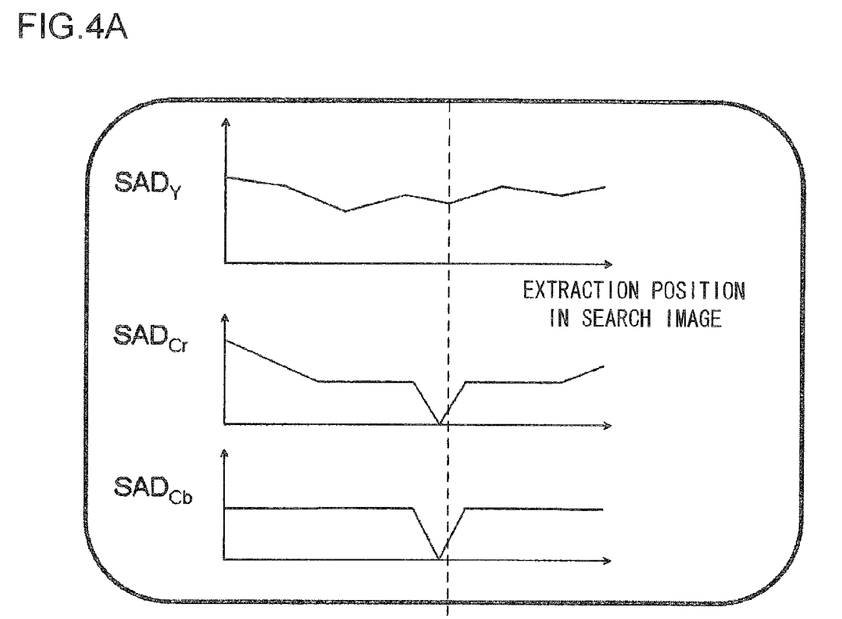
FIGS. 4A and 4B present a schematic illustration of a specific example of a similarity factor calculated by using normalized values.
Figure 4B:
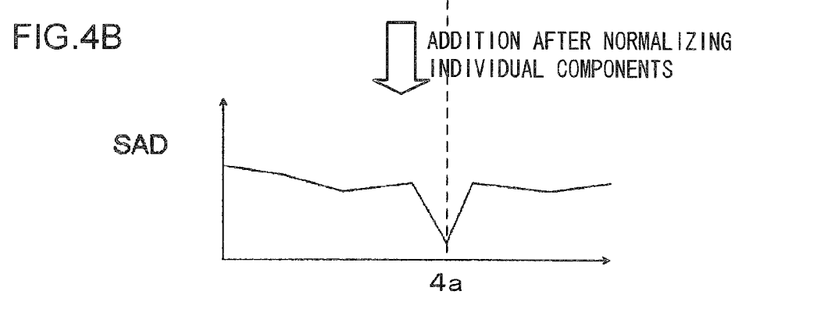

For instance, even when the gain applied to $SAD_Y$ is greater than the gains applied to $SAD_{Cr}$ and $SAD_{Cb}$ as shown in FIG. 3A, the gains corresponding to the various similarity factors can be equalized through normalization as shown in FIG. 4A. Thus, the sum of the normalized similarity factors corresponding to the various components takes on the smallest value at an extraction position 4a, which is the correct subject position, as indicated in FIG. 4B, and consequently, the subject position can be determined accurately.

The control device 104 in the embodiment simply needs to calculate the similarity factor indicating the level of similarity between the template image and each comparison target image as expressed in (11) in step S3 in FIG. 2. Then, after calculating the similarity factors for the entire input image (after making an affirmative decision in step S4), the control device is able to determine the subject position within the input image simply by designating the extraction position at which the comparison target image with the least SAD has been sliced out as the subject position. The control device 104, repeatedly executing the processing described above through a plurality of frames, is able to track the subject by identifying the subject position within each frame.

The following operational effects are achieved through the first embodiment described above.

(1) The control device 104 compares a frame of live view image with the template image for the brightness component (Y component) and the chrominance components (Cr component and Cb component), which assume specific values to characterize each image and calculates the similarity factors $SAD_Y$, $SAD_{Cr}$ and $SAD_{Cb}$ in correspondence to the individual components. The control device 104 then normalizes the individual component similarity factors by multiplying the calculated component similarity factors by similarity factor normalizing values. Based upon the normalized similarity factors corresponding to the individual components, the control device 104 calculates the similarity factor SAD indicating the level of similarity between the frame and the template image. As a result, the level of subject tracking performance is improved through the normalization of the individual component similarity factors.

(2) Similarity factor normalizing values to be used to equalize the individual component similarity factor values are calculated in advance and the control device 104 normalizes the individual component similarity factors so as to equalize the individual component similarity factor values by using the similarity factor normalizing values. As a result, even when a significantly larger gain is initially applied to a given component similarity factor, the similarity factor corresponding to the particular component is not allowed to cause the wrong position within the frame to be erroneously designated as the subject position.

Second Embodiment

In the first embodiment described above, the individual component similarity factors, i.e., $SAD_Y$, $SAD_{Cr}$ and $SAD_{Cb}$ are first normalized by multiplying them by the similarity factor normalizing values $N_y$, $N_{Cr}$ and $N_{Cb}$ and then the similarity factor SAD indicating the level of similarity between the frame and the template image is calculated based upon the normalized individual component similarity factors, so as to improve the level of subject tracking performance.

In the second embodiment, after normalizing the individual component similarity factors as in the first embodiment, the similarity factor SAD is calculated by weighting the normalized brightness component similarity factor ($SAD_Y$) or the normalized chrominance is component similarity factors ($SAD_{Cr}$ and $SAD_{Cb}$), so as to further improve the level of the subject tracking performance. It is to be noted that any aspect of the second embodiment to which FIGS. 1 to 3 also apply, that is similar to the first embodiment is not repeatedly explained and that the following explanation focuses on the features distinguishing it from the first embodiment.

The control device 104 in the second embodiment weights the normalized components based upon the level of color saturation in the matching-target frame. For instance, if the level of color saturation in the matching-target frame is high, the tracking performance can be improved with the similarity factor calculated by targeting the chrominance components for evaluation rather than the brightness component and accordingly, SAD is calculated by applying greater weight to the normalized chrominance component similarity factors ($SAD_{Cb}$ and $SAD_{Cr}$). If, on the other hand, the color saturation in the matching-target frame is low, better tracking performance can be assured with the similarity factor calculated by targeting the brightness component for evaluation rather than the chrominance components and accordingly, SAD is calculated by applying greater weight to the normalized brightness component similarity factor ($SAD_Y$).

For instance, the control device 104 may calculate SAD as expressed in (12) below by using a parameter α in weighting the normalized similarity factors corresponding to the various components.

$$SAD = \frac{1}{3}\left(2 \cdot (1-\alpha) \cdot N_y \cdot SAD_Y + \alpha \cdot \begin{pmatrix} N_{Cr} \cdot SAD_{Cr} + \\ N_{Cb} \cdot SAD_{Cb} \end{pmatrix}\right) \quad (12)$$

It is to be noted that the parameter α in the embodiment, which corresponds to a parameter indicating the color saturation and assuming a range of 0<α<1, takes on the form of a function expressed as $\alpha=1/(1+e^{-ax+b})$ provided that x=(1/number of pixels)·Σ(|Cr|+|Cb|).

By weighting the individual component similarity factors, which have been normalized, based upon the parameter α as described above, SAD can be calculated based upon the individual component similarity factors weighted in correspondence to the saturation level of the image after adjusting the gains applied to the similarity factors for uniformity and, as a result, a further improvement in the level of subject tracking performance is achieved.

When the color saturation of the matching-target frame is high, i.e., when the matching-target frame is highly chromatic, the parameter a should assume a larger value, so as to calculate the similarity factor by heavily weighting the chrominance components for evaluation over the brightness component and ultimately improve the tracking performance.

Figure 5A:
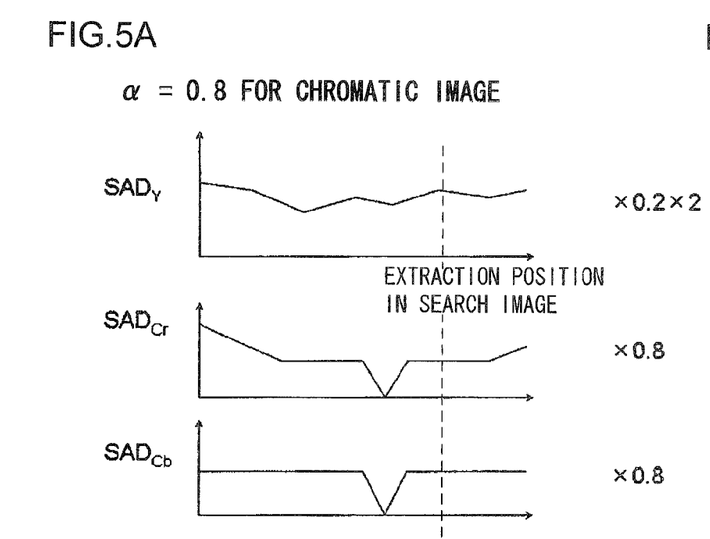
FIGS. 5A to 5D present a schematic illustration of a specific example of a similarity factor calculated by weighting the normalized values.
Figure 5B:
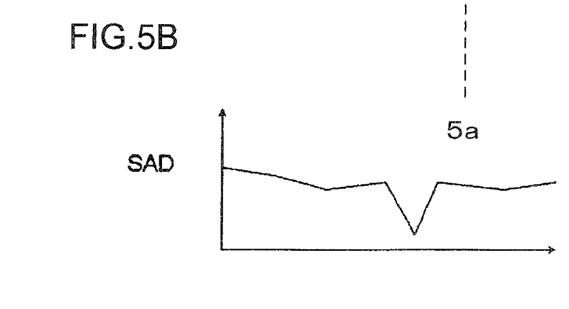

When the matching-target frame is highly chromatic, a may be set to, for instance, 0.8. In such a case, the brightness component $SAD_Y$ will be multiplied by 0.2×2 and the chrominance components $SAD_{Cr}$ and $SAD_{Cb}$ will each be multiplied by 0.8 in expression (12) as indicated in FIG. 5A. As a result, the similarity factor SAD can be calculated by lowering the extent to which the brightness component $SAD_Y$ factors into the calculation. The similarity factor SAD thus calculated, less affected by $SAD_Y$, takes on the smallest value at an extraction position 5a, i.e., the correct subject position, as shown in FIG. 5B, to allow the subject position to be determined accurately.

If, on the other hand, the color saturation in the matching-target frame is low, i.e., if the matching-target frame is achromatic, the parameter α to a smaller value of, for instance, 0.2, so as to calculate the similarity factor by heavily weighting the brightness component, for evaluation over the chrominance components and ultimately improve the tracking performance.

Figure 5C:
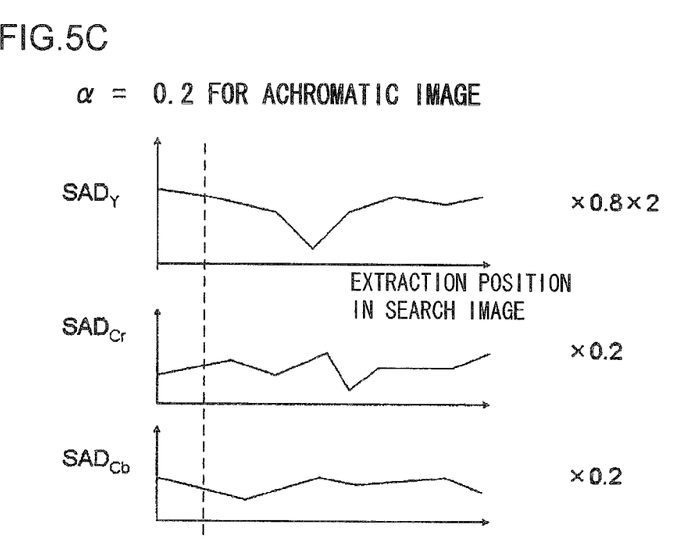
Figure 5D:
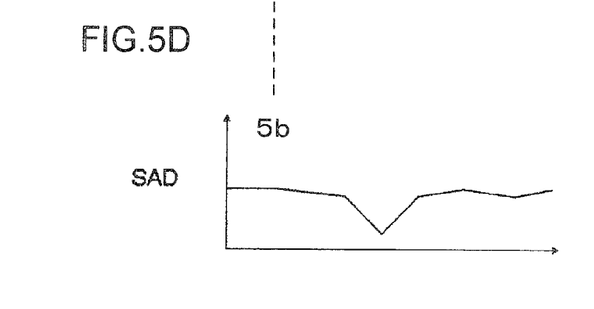

When the matching-target frame is achromatic, and α is set to, for instance, 0.2, the brightness component $SAD_Y$ will be multiplied by 0.8×2 and the chrominance components $SAD_{Cr}$ and $SAD_{Cb}$ will each be multiplied by 0.2 in expression (12) as indicated in FIG. 5C. As a result, the similarity factor SAD can be calculated by lowering the extent to which the chrominance components $SAD_{Cr}$ and $SAD_{Cb}$ factor into the calculation. The similarity factor SAD thus calculated, less affected by $SAD_{Cr}$ and $SAD_{Cb}$, takes on the smallest value at an extraction position 5b, i.e., the correct subject position, as shown in FIG. 5D, to allow the subject position to be determined accurately.

In the second embodiment described above, the control device 104 calculates the similarity factor (SAD) by first normalizing the individual component SAD factors and then weighting the normalized brightness component similarity factor ($SAD_Y$) or the normalized chrominance component similarity factors ($SAD_{cr}$ and $SAD_{Cb}$) based upon the color saturation of the target frame. Through these measures, an advantage is achieved in that better subject tracking performance is assured.

—Variations—

It is to be noted that the subject tracking devices achieved in the embodiments described above allow for the following variations.

(1) In both the first embodiment and the second embodiment described above, the control device 104 calculates the similarity factor through the SAD (sum of absolute differences) method among various similarity factor calculation methods. However, the present invention is not limited to this example and it may be adopted equally effectively in conjunction with a similarity factor calculated through a method other than the SAD method, such as a similarity factor calculated through an SSD (sum of squared differences) method or by using a color histogram.

(2) The control device 104 in both the first embodiment and the second embodiment executes subject tracking for live view images. However, the present invention is not limited to this example and provided that the camera 100 is equipped with a dynamic image photographing function, the control device 104 may execute frame-to-frame subject tracking for the frames of images constituting a dynamic image or moving image that has already been photographed, instead of live view images.

(3) In the first and second embodiments described above, the control device 104 in the camera 100 functions as a subject tracking device that executes subject tracking through the processing executed as shown in FIG. 2. However, a program based upon which the processing in FIG. 2 is executed may be recorded in another terminal such as a personal computer so as to enable the terminal to execute the processing. In such a case, processing may be executed on dynamic image data expressing a dynamic image photographed in the camera and taken into the terminal so as to execute frame-to-frame subject tracking for the frames of images constituting the dynamic image. In addition, the subject tracking device according to the present invention may be installed in a different type of electronic device such as a camera-equipped portable telephone.

(4) In the first and second embodiments described above, similarity factors are calculated in correspondence to a plurality of types of components, i.e., the brightness component (Y component) and the chrominance components (Cr component and Cb component), which assume specific characteristic quantity values to characterize each image. However, similarity factors may be calculated in correspondence to characteristics components other than these. For instance, the R component, the G component and the B component may be assigned as the plurality of types of characteristics components expressing the input image. In such a case, similarity factors will be individually calculated in correspondence to the R component, the G component or the B component.

As long as the functions characterizing the present invention remain intact, the invention is in no way limited to the structural details described in reference to the is embodiments. In addition, either of the embodiments may be adopted in combination with a plurality of variations.

Through either of the embodiments of the present invention described above, a similarity factor can be calculated accurately through normalization even when different gains are applied to various image components.

What is claimed is:

1. A subject tracking device, comprising:
a control device, including at least a CPU, the control device being configured to:
compare an input image assuming characteristics quantities corresponding to a plurality of characteristics components, with a template image assuming characteristics quantities corresponding to the plurality of characteristics components, and calculate a first similarity factor indicating a level of similarity between the input image and the template image in correspondence to each of the plurality of characteristics components;
normalize the first similarity factors corresponding to the plurality of characteristics components by multiplying the first similarity factors by normalizing values used to equalize the first similarity factors corresponding to the individual characteristic components; and
calculate a second similarity factor indicating a level of similarity between the input image and the template image based upon results of normalization of the first similarity factors.

2. A subject tracking device according to claim 1, wherein the control device is further configured to:
weight the first similarity factors, having been calculated for the plurality of characteristics components, in correspondence to characteristics of the input image.

3. A subject tracking device according to claim 1, wherein:
the normalizing values are calculated and recorded into a storage medium in advance; and
the control device reads out the normalizing values from the storage medium and executes normalization.

4. A subject tracking device according to claim 1, wherein:
the plurality of characteristics components are a brightness component and a chrominance component of the image; and
the control device calculates the first similarity factor indicating a level of similarity between the brightness component of the input image and the brightness component of the template image and the first similarity factor indicating a level of similarity between the chrominance component in the input image and the chrominance component in the template image.

5. A camera equipped with a subject tracking device according to claim 1.

* * * * *